(12) United States Patent
Bennett (10) Patent No.: US 7,619,844 B1
(45) Date of Patent: Nov. 17, 2009

(54) DISK DRIVE COMPRISING A MECHANICAL POSITION SENSOR TO PREVENT A RUNAWAY CONDITION

(75) Inventor: George J. Bennett, Murrieta, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 409 days.

(21) Appl. No.: 11/322,908

(22) Filed: Dec. 30, 2005

(51) Int. Cl.
*G11B 21/02* (2006.01)
(52) U.S. Cl. ......................................................... 360/75
(58) Field of Classification Search ................... None
See application file for complete search history.

(56) References Cited

U.S. PATENT DOCUMENTS

| | | |
|---|---|---|
| 3,806,254 A | 4/1974 | Ha et al. |
| 4,396,959 A | 8/1983 | Harrison et al. |
| 4,516,177 A | 5/1985 | Moon et al. |
| 4,967,291 A | 10/1990 | Touchton et al. |
| 4,974,109 A | 11/1990 | Hoshimi et al. |
| 5,227,930 A | 7/1993 | Thanos et al. |
| 5,270,886 A | 12/1993 | Nigam |
| 5,426,545 A | 6/1995 | Sidman et al. |
| 5,442,172 A | 8/1995 | Chiang et al. |
| 5,459,383 A | 10/1995 | Sidman et al. |
| 5,471,304 A | 11/1995 | Wang |
| 5,471,734 A | 12/1995 | Hatch et al. |
| 5,563,868 A | 10/1996 | Farnsworth et al. |
| 5,619,387 A | 4/1997 | Ottesen et al. |
| 5,666,236 A | 9/1997 | Bracken et al. |
| 5,828,508 A | 10/1998 | Whaley et al. |
| 5,831,786 A | 11/1998 | Boutaghou et al. |
| 5,856,895 A | 1/1999 | Schaenzer et al. |
| 5,909,333 A * | 6/1999 | Best et al. ..................... 360/51 |
| 6,052,250 A | 4/2000 | Golowka et al. |
| 6,054,833 A | 4/2000 | Takeuchi |
| 6,064,540 A | 5/2000 | Huang et al. |
| 6,072,655 A | 6/2000 | Uwabo et al. |
| 6,075,667 A | 6/2000 | Kisaka et al. |
| 6,100,623 A | 8/2000 | Huang et al. |
| 6,128,155 A | 10/2000 | Sugawara et al. |
| 6,157,522 A | 12/2000 | Murphy et al. |

(Continued)

OTHER PUBLICATIONS

UDT Sensors Inc., "Non-contact optical position sensing using silicon photodetectors", App Note No. Apr. 13, 1982, http://www.udt.com.

(Continued)

*Primary Examiner*—K. Wong
(74) *Attorney, Agent, or Firm*—Howard H. Sheerin, Esq.

(57) ABSTRACT

A disk drive is disclosed including a disk having a plurality of servo sectors that define a plurality of servo tracks, an actuator arm, a head attached to a distal end of the actuator arm, a mechanical position sensor operable to detect an estimated position of the actuator arm, and a voice coil motor for rotating the actuator arm about a pivot. The disk drive further comprises control circuitry operable to process the servo sectors to generate a control signal applied to the voice coil motor, detect an estimated velocity of the actuator arm, detect a runaway condition in response to the estimated position of the actuator arm and the estimated velocity of the actuator arm, and adjust the control signal applied to the voice coil motor if the runaway condition is detected.

14 Claims, 13 Drawing Sheets

U.S. PATENT DOCUMENTS

| | | | |
|---|---|---|---|
| 6,169,382 B1 | 1/2001 | McKenzie et al. | |
| 6,233,106 B1 | 5/2001 | Chambers | |
| 6,304,398 B1 | 10/2001 | Gaub et al. | |
| 6,307,702 B1 * | 10/2001 | Fukushi et al. | 360/75 |
| 6,310,746 B1 | 10/2001 | Hawwa et al. | |
| 6,396,652 B1 | 5/2002 | Kawachi et al. | |
| 6,407,876 B1 | 6/2002 | Yamaguchi et al. | |
| 6,407,877 B1 | 6/2002 | Mitani | |
| 6,493,170 B1 | 12/2002 | Kato et al. | |
| 6,515,834 B1 | 2/2003 | Murphy | |
| 6,535,347 B1 | 3/2003 | Wakuda | |
| 6,542,326 B1 | 4/2003 | Ell et al. | |
| 6,563,660 B1 | 5/2003 | Hirano et al. | |
| 6,583,948 B1 | 6/2003 | Taniguchi | |
| 6,583,964 B1 | 6/2003 | Huang et al. | |
| 6,603,629 B1 | 8/2003 | Tsai | |
| 6,604,431 B1 | 8/2003 | Soga et al. | |
| 6,614,613 B1 | 9/2003 | Huang et al. | |
| 6,618,217 B2 | 9/2003 | Heaton et al. | |
| 6,618,218 B1 | 9/2003 | Kadowaki et al. | |
| 6,621,653 B1 | 9/2003 | Schirle | |
| 6,624,983 B1 | 9/2003 | Berding | |
| 6,631,047 B2 | 10/2003 | Ishizuka et al. | |
| 6,674,600 B1 | 1/2004 | Codilian et al. | |
| 6,690,551 B2 | 2/2004 | Shiraishi et al. | |
| 6,697,211 B2 | 2/2004 | Koganezawa | |
| 6,707,632 B1 | 3/2004 | Raphael et al. | |
| 6,747,834 B1 | 6/2004 | Matsuyama | |
| 6,781,778 B1 | 8/2004 | Molstad et al. | |
| 6,791,784 B2 | 9/2004 | Edwards | |
| 6,798,609 B1 | 9/2004 | Bonin et al. | |
| 6,816,334 B2 | 11/2004 | Watanabe et al. | |
| 6,829,118 B1 * | 12/2004 | Takamiya et al. | 360/73.03 |
| 6,831,808 B2 | 12/2004 | Ottesen et al. | |
| 6,888,694 B2 | 5/2005 | Guo et al. | |
| 6,914,745 B2 | 7/2005 | Takeuchi et al. | |
| 6,924,958 B2 | 8/2005 | Vigna et al. | |
| 6,934,117 B2 | 8/2005 | Huang et al. | |
| 6,943,978 B1 | 9/2005 | Lee | |
| 7,002,771 B2 | 2/2006 | Christie, Jr. et al. | |
| 7,019,938 B2 * | 3/2006 | Miyata et al. | 360/78.05 |
| 7,154,689 B1 * | 12/2006 | Shepherd et al. | 360/48 |
| 7,170,705 B2 * | 1/2007 | Shimizu et al. | 360/60 |
| 7,209,311 B2 * | 4/2007 | Ueda et al. | 360/77.06 |
| 7,215,504 B1 | 5/2007 | Bennett | |
| 7,365,932 B1 | 4/2008 | Bennett | |
| 7,495,857 B1 | 2/2009 | Bennett | |
| 2002/0054451 A1 | 5/2002 | Moon et al. | |
| 2002/0109931 A1 | 8/2002 | Vigna et al. | |
| 2003/0053244 A1 | 3/2003 | Lewis | |
| 2003/0133219 A1 | 7/2003 | Ishizuka et al. | |
| 2003/0147181 A1 | 8/2003 | Shiraishi et al. | |
| 2004/0001280 A1 | 1/2004 | Ikedo et al. | |
| 2004/0051993 A1 | 3/2004 | Shin | |
| 2004/0246833 A1 | 12/2004 | Ehrlich | |
| 2006/0119977 A1 | 6/2006 | Zhu et al. | |

OTHER PUBLICATIONS

M. Kobayashi et al., "Multi-Sensing Servo with Carriage-Acceleration Feedback for Magnetic Disk Drives", Proceedings of the American Control Conference, Jun. 1998, pp. 3038-3042.

F.Y. Huang et al., "Active Damping in HDD Actuator", IEEE Transactions on Magnetics, vol. 37, No. 2, Mar. 2001, pp. 847-849.

Notice of Allowance dated Dec. 12, 2007 from U.S. Appl. No. 11/336,316, 9 pages.

Notice of Allowance dated Dec. 13, 2007 from U.S. Appl. No. 11/323,251, 12 pages.

Office Action dated Jul. 20, 2007, from U.S. Appl. No. 11/336,316, 7 pages.

Office Action dated Jan. 9, 2007 from U.S. Appl. No. 11/323,251, 14 pages.

Notice of Allowance dated Jul. 10, 2007 from U.S. Appl. No. 11/323,251, 8 pages.

Office Action dated Sep. 21, 2006 from U.S. Appl. No. 11/253,400, 15 pages.

Notice of Allowance dated Jan. 24, 2007 from U.S. Appl. No. 11/253,400, 6 pages.

Office Action dated May 8, 2007 from U.S. Appl. No. 11/336,316, 15 pages.

Notice of Allowance dated Aug. 27, 2008, from U.S. Appl. No. 11/336,316, 6 pages.

Notice of Allowance dated Nov. 10, 2008 from U.S. Appl. No. 11/322,907, 14 pages.

Office Action dated Apr. 17, 2008 from U.S. Appl. No. 11/322,907, 34 pages.

Notice of Allowance dated Apr. 18, 2008 from U.S. Appl. No. 11/336,316, 8 pages.

Office Action dated Sep. 15, 2009 from U.S. Appl. No. 12/277,040, 21 pages.

* cited by examiner

DISK DRIVE COMPRISING A MECHANICAL POSITION SENSOR TO PREVENT A RUNAWAY CONDITION

BACKGROUND OF THE INVENTION

1. Field of the Invention

The present invention relates to disk drives for computer systems. More particularly, the present invention relates to a disk drive comprising a mechanical position sensor to prevent a runaway condition.

2. Description of the Prior Art

Figure 1A:
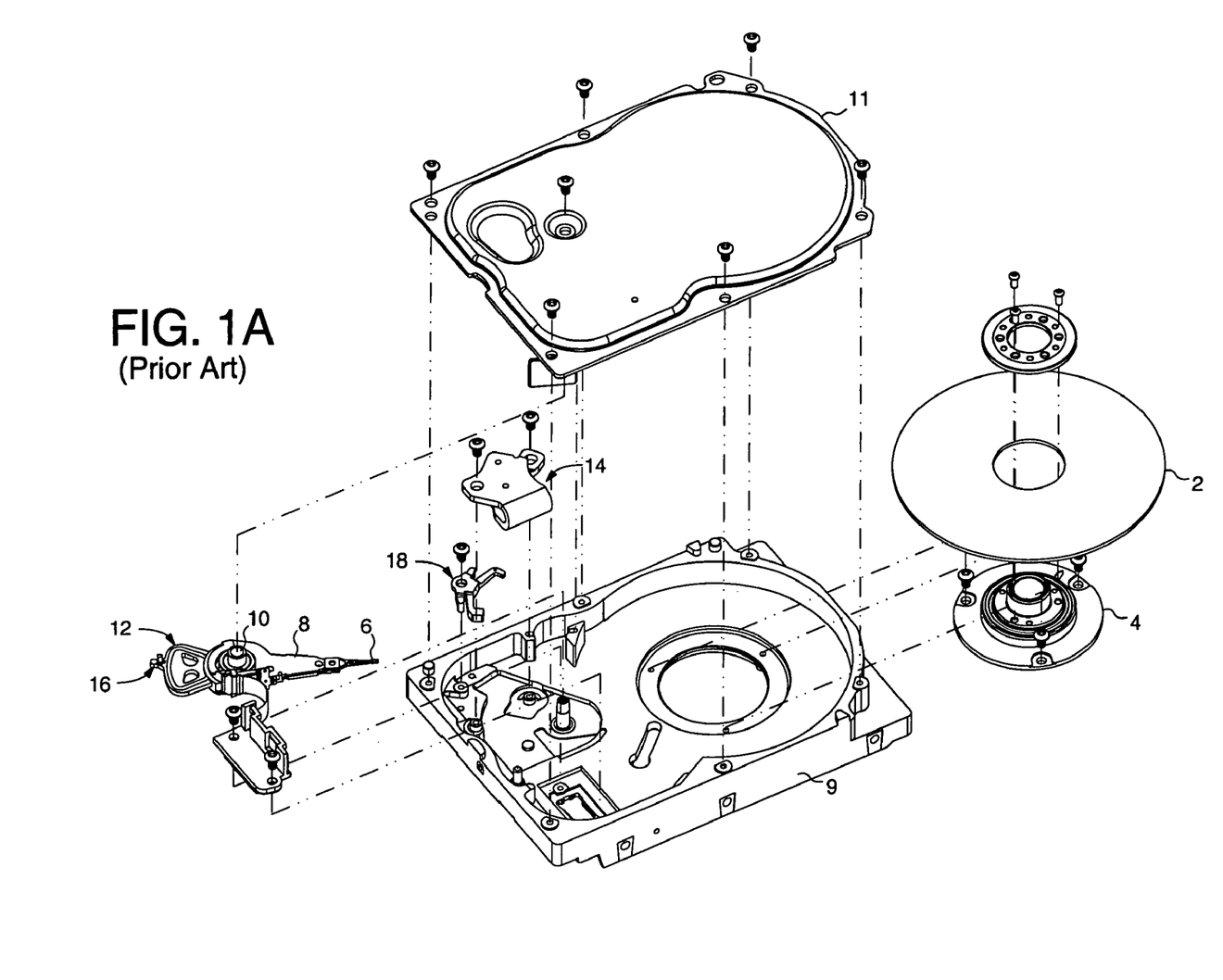
FIG. 1A shows a prior art disk drive comprising a head actuated over a disk by a voice coil motor in response to servo sectors recorded on the disk.

FIG. 1A shows an exploded view of a prior art disk drive comprising a disk 2 rotated by a spindle motor 4, and a head 6 coupled to a distal end of an actuator arm 8 which is rotated about a pivot 10 by a voice coil motor (VCM) in order to actuate the head 6 over the disk 2. The disk 2, spindle motor 4, head 6, actuator arm 8, and VCM are enclosed in a head disk assembly (HDA) comprising a base 9 and a cover 11. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp located at the outer periphery of the disk 2 when the disk drive is powered down.

Figure 1B:
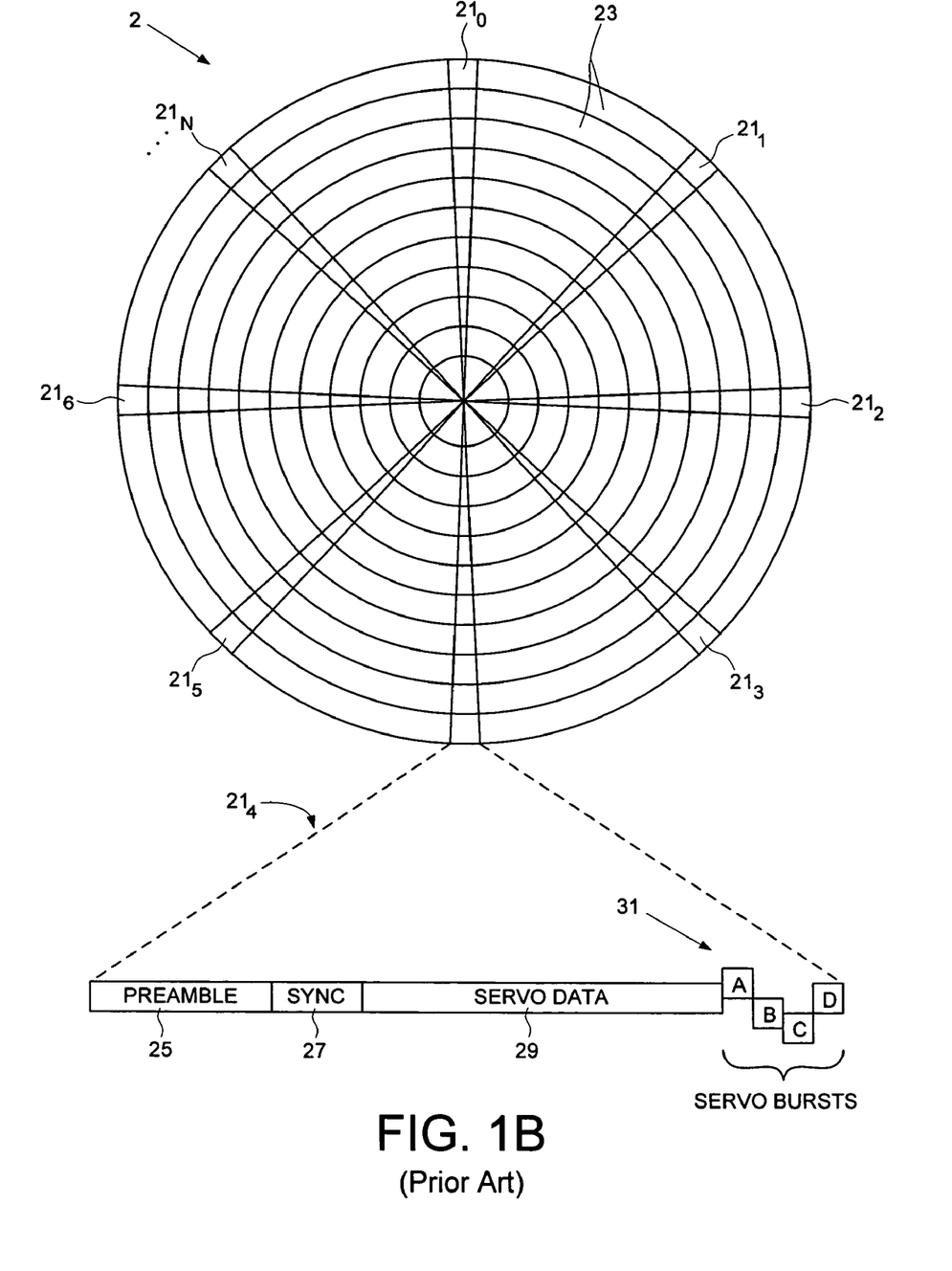
FIG. 1B shows a prior art disk format wherein the servo sectors comprise a plurality of servo bursts that define a plurality of radially spaced, concentric servo tracks.

Servo sectors $21_0$-$21_N$ are written to the disk 2 to define a plurality of radially spaced, concentric servo tracks 23 as shown in the prior art disk format of FIG. 1B. A plurality of data tracks are defined relative to the servo tracks 23, wherein each data track is partitioned into a plurality of data sectors with embedded servo sectors $21_0$-$21_N$. Each servo sector (e.g., servo sector 214) comprises a preamble 25 for synchronizing gain control and timing recovery, a sync mark 27 for synchronizing to a data field 29 comprising coarse head positioning information such as a track number, and servo bursts 31 which provide fine head positioning information. The coarse head position information is processed to position a head over a target track during a seek operation, and the servo bursts 31 are processed to maintain the head over a centerline of the target track while writing or reading data during a tracking operation. If the servo control circuitry malfunctions during the middle of a seek operation, for example, if a microprocessor malfunctions due to a programming error, or if synchronization to the servo sectors $21_0$-$21_N$ is lost, it may cause the actuator arm 8 to collide with the crash stop 18 at a high speed. The resulting vibrations in the actuator arm 8 due to the collision with the crash stop 18 may damage the head 6.

There is, therefore, a need to prevent the actuator arm in a disk drive from colliding with a crash stop at high speeds due to a malfunction in the servo control circuitry.

SUMMARY OF THE INVENTION

An embodiment of the present invention comprises a disk drive including a disk having a plurality of servo sectors that define a plurality of servo tracks, an actuator arm, a head attached to a distal end of the actuator arm, a mechanical position sensor operable to detect an estimated position of the actuator arm, and a voice coil motor for rotating the actuator arm about a pivot. The disk drive further comprises control circuitry operable to process the servo sectors to generate a control signal applied to the voice coil motor, detect an estimated velocity of the actuator arm, detect a runaway condition in response to the estimated position of the actuator arm and the estimated velocity of the actuator arm, and adjust the control signal applied to the voice coil motor if the runaway condition is detected.

In one embodiment, the mechanical position sensor comprises an optical sensor.

In another embodiment, the control circuitry is further operable to detect the estimated velocity of the actuator arm by computing a derivative of the estimated position detected by the mechanical position sensor.

In yet another embodiment, the control circuitry comprises analog circuitry operable to detect the estimated velocity of the actuator arm in continuous time. In another embodiment, the control circuitry comprises analog circuitry operable to detect the runaway condition by processing the estimated position and estimated velocity in continuous time.

In still another embodiment, the control circuitry is further operable to compare the estimated position to the estimated velocity to detect the runaway condition. In one embodiment, the control circuitry comprises an analog comparator operable to compare the estimated position to the estimated velocity in continuous time. In an alternative embodiment, the control circuitry comprises discrete time circuitry operable to detect the runaway condition by processing the estimated position and estimated velocity in discrete time.

Another embodiment of the present invention comprises a method of operating a disk drive, the disk drive comprising a disk having a plurality of servo sectors that define a plurality of servo tracks, an actuator arm, a head attached to a distal end of the actuator arm, a mechanical position sensor operable to detect an estimated position of the actuator arm, and a voice coil motor for rotating the actuator arm about a pivot. The method comprises the steps of processing the servo sectors to generate a control signal applied to the voice coil motor, detecting an estimated velocity of the actuator arm, detecting a runaway condition in response to the estimated position of the actuator arm and the estimated velocity of the actuator arm, and adjusting the control signal applied to the voice coil motor if the runaway condition is detected.

DESCRIPTION OF THE PREFERRED EMBODIMENTS

Figure 2A:
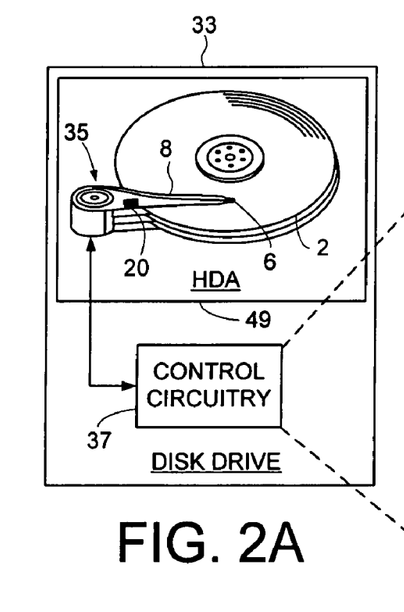
FIG. 2A shows a disk drive according to an embodiment of the present invention comprising control circuitry and a mechanical position sensor for detecting a runaway condition.
Figure 2B:
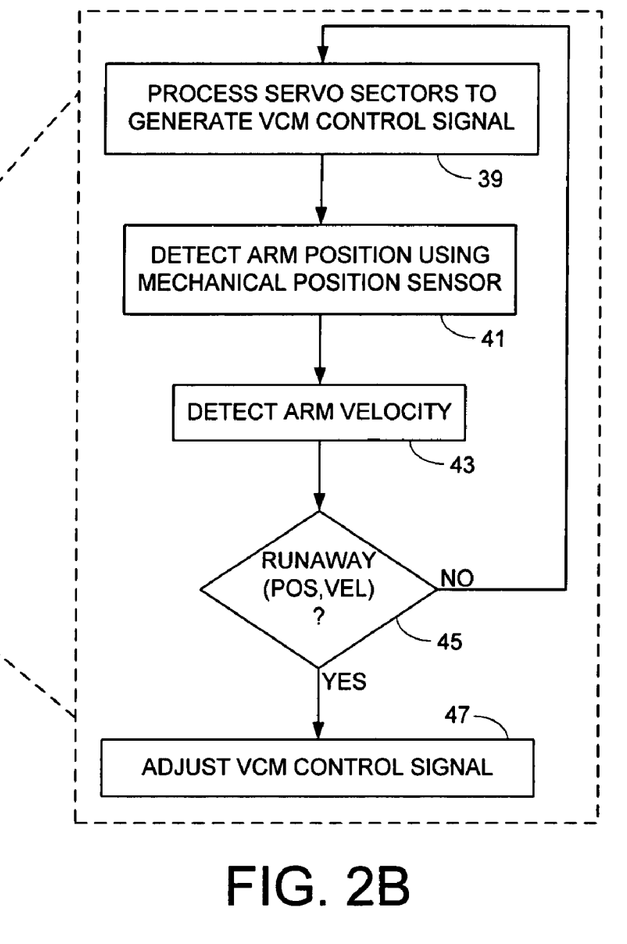
FIG. 2B is a flow diagram executed by the control circuitry to detect the runaway condition by processing the position of the actuator arm detected by the mechanical position sensor.

FIG. 2A shows a disk drive 33 according to an embodiment of the present invention including a disk 2 having a plurality of servo sectors $21_0$-$21_N$ that define a plurality of servo tracks 23, an actuator arm 8, a head 6 attached to a distal end of the actuator arm 8, a mechanical position sensor 20 operable to detect an estimated position of the actuator arm 8, and a voice coil motor 35 for rotating the actuator arm 8 about a pivot. The disk drive 33 further comprises control circuitry 37 for executing the flow diagram of FIG. 2B in order to detect a runaway condition. At step 39 the servo sectors $21_0$-$21_N$ are processed to generate a control signal applied to the voice coil motor 35. At step 41 an estimated position of the actuator arm 8 is detected using the mechanical position sensor 20, and at step 43 an estimated velocity of the actuator arm 8 is detected. At step 45 a runaway condition is detected in response to the estimated position of the actuator arm 8 and the estimated velocity of the actuator arm 8, and at step 47 the control signal applied to the voice coil motor 35 is adjusted if the runaway condition is detected.

Any suitable control circuitry may be employed to implement the described embodiments of the present invention. In one embodiment, the control circuitry comprises a microprocessor executing instructions which may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry comprises suitable logic circuitry, such as state machine circuitry. In still another embodiment, the control circuitry comprises suitable discrete-time circuitry and/or analog circuitry.

In the embodiment of FIG. 2A, the disk 2, head 6, actuator arm 8, and voice coil motor 35 are enclosed in a head disk assembly (HDA) 49, wherein the control circuitry 37 is mounted on a printed circuit board coupled to the HDA 49. In one embodiment, the mechanical position sensor 20 is also completely enclosed in the HDA 49, and in an alternative embodiment, all or part of the mechanical position sensor 20 is located outside of the HDA 49 wherein the HDA 49 comprises suitable access (e.g., a window) to facilitate operation of the mechanical position sensor 20.

Figure 3A:
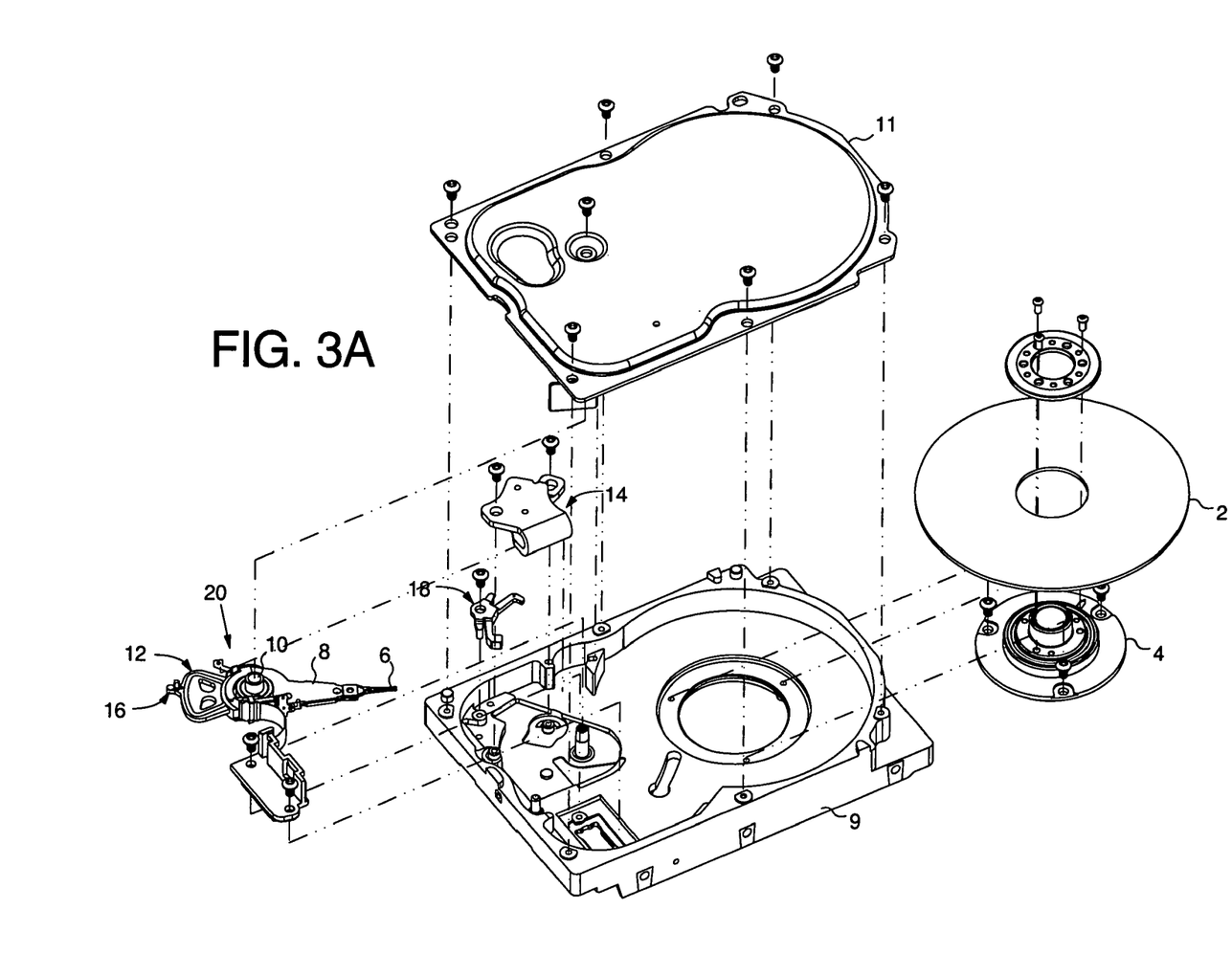
FIG. 3A shows a disk drive according to an embodiment of the present invention wherein the mechanical position sensor comprises an optical sensor for detecting a position of the actuator arm.
Figure 3B:
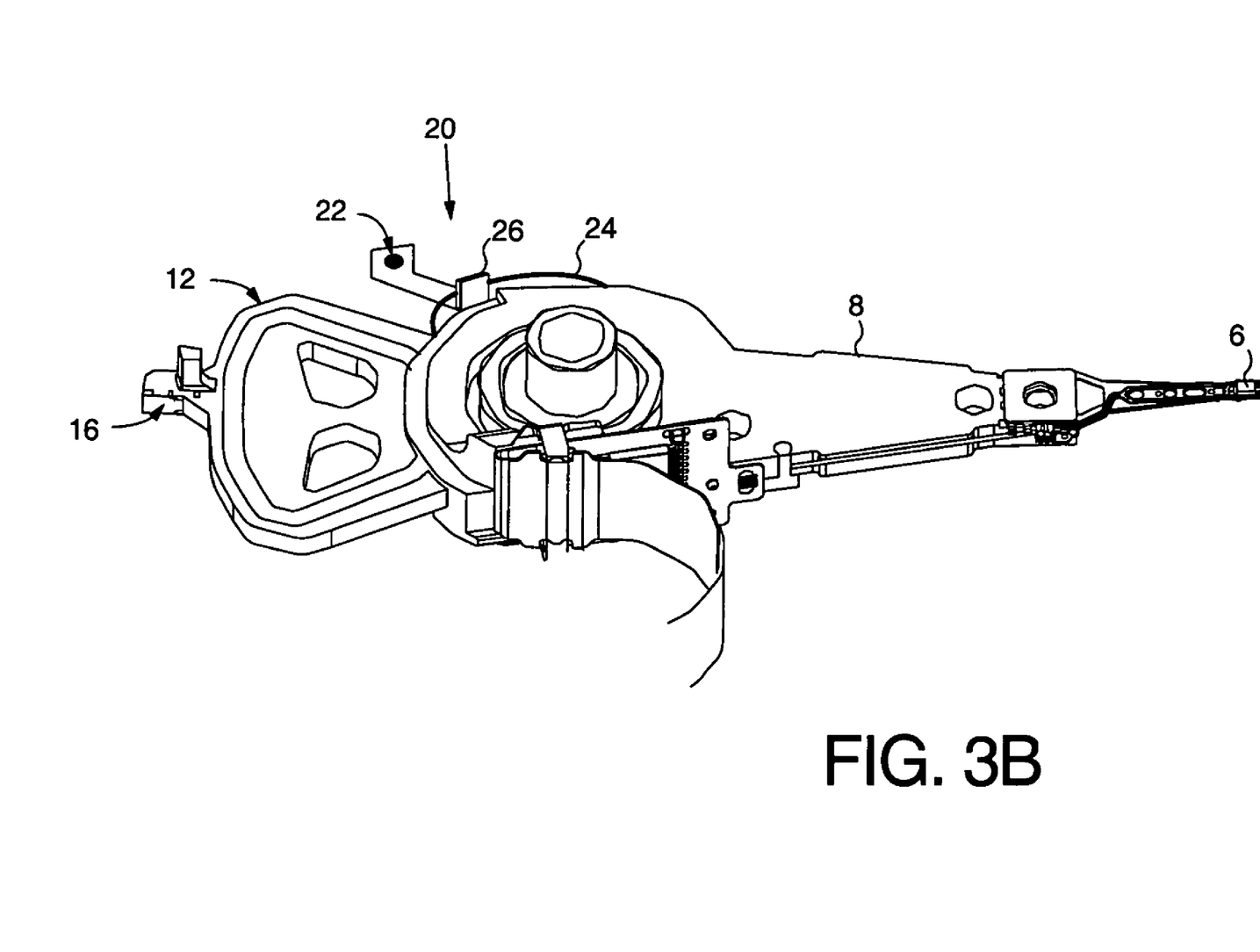
FIG. 3B shows an actuator arm according to an embodiment of the present invention wherein the optical sensor comprises a light source, a plurality of light sensitive sensors, and an opaque element positioned between the light source and the light sensitive sensors.

Any suitable mechanical position sensor 20 may be employed in the embodiments of the present invention, such as a Hall effect sensor. FIG. 3A shows a disk drive according to an embodiment of the present invention wherein the mechanical position sensor 20 comprises an optical sensor 20. Any suitable optical sensor 20 may be employed in embodiments of the present invention, such as a diffraction grating optical sensor or a gray-scale pattern optical sensor. FIG. 3B shows an embodiment of an optical sensor 20 comprising a light source 22, a plurality of light sensitive sensors 26 positioned to receive light from the light source 22, and a substantially opaque element 24 positioned between the light source 22 and the light sensitive sensors 26 configured to control an amount of light at least one of the plurality of light sensitive sensors 26 detects relative to the position of the actuator arm 8. The light source 22 comprises a light emitting device, such as a light emitting diode (LED), that is stationary relative to the base 9. The opaque element 24 comprises a linear element, such as a wire, coupled to the actuator arm 8. The light source 22 and light sensitive sensors 26 are aligned substantially horizontally with respect to the surface of the disk 2 (and the planar surface of the actuator arm 8). The light sensitive sensors 26 are stationary relative to the base 9 such that the opaque element 24 moves with the actuator arm 8 relative to the light sensitive sensors 26, thereby changing the amount of light each light sensitive sensor 26 detects.

Figure 4A:
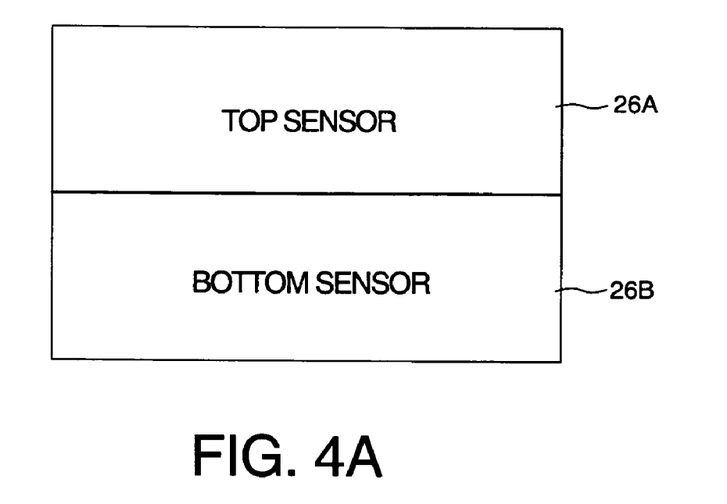
FIG. 4A shows an embodiment of the present invention wherein the plurality of light sensitive sensors comprise top and bottom sensors.

In the embodiment of FIG. 3B, the light sensitive sensors 26 comprise a top sensor 26A and a bottom sensor 26B as illustrated in FIG. 4A. Any suitable light sensitive sensor 26 may be employed in embodiments of the present invention, such as a photo resistor, a charge-coupled device (CCD), a CdS/CdSe photo sensor, or a silicon based photovoltaic cell (photodiode). A light sensitive sensor 26 having a high bandwidth (e.g., a photovoltaic cell) may be preferred depending on the application. The light sensitive sensors 26A and 26B are shown adjacent one another in the embodiment of FIG. 4A, and may be integrated into a single component (e.g., separate regions of a CCD or CdS/CdSe photo sensor). In an alternative embodiment, the light sensitive sensors 26A and 26B may be manufactured as separate components and may also be separated by any suitable distance.

Figure 4B:
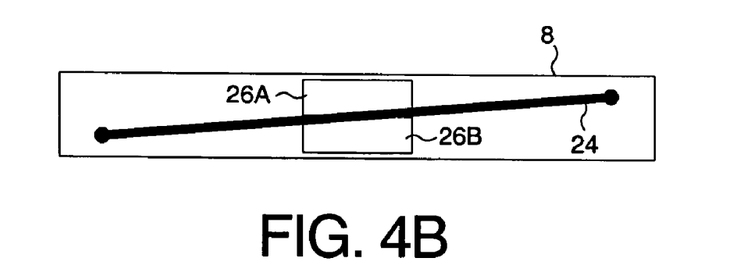
FIGS. 4B-4D illustrate how the opaque element controls the amount of light each sensor detects relative to the position of the actuator arm according to an embodiment of the present invention.
Figure 4C:
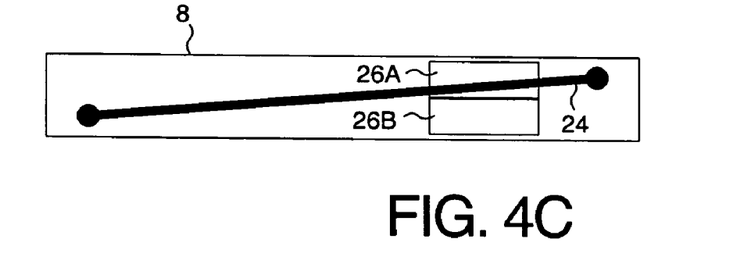
Figure 4D:
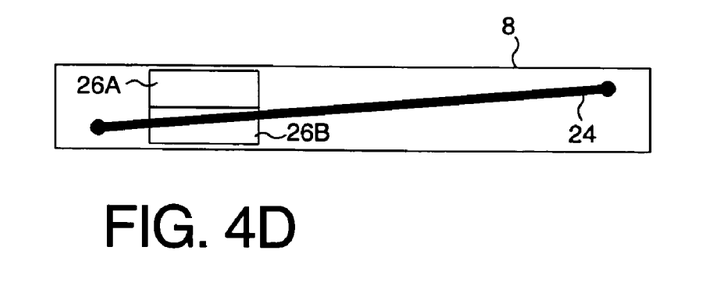

Operation of the optical sensor 20 shown in FIG. 3B is illustrated in FIGS. 4B-4D, which show a side view of the actuator arm 8 from the perspective of the light emitting device 22 looking toward the light sensitive sensors 26A and 26B. In this embodiment, the opaque element 24 (a linear element) has a sloping angle with respect to the actuator arm 8. In FIG. 4B, the actuator arm 8 is positioned near the middle of its stroke such that each light sensitive sensor 26A and 26B receives an equal amount of light. In FIG. 4C, the actuator arm 8 is rotated in one direction (e.g., toward the OD) such that the bottom sensor 26B receives more light than the top sensor 26A, and in FIG. 4D the actuator arm 8 is rotated in the opposite direction (e.g., toward the ID) such that top sensor 26A receives more light than the bottom sensor 26B.

Although the opaque element 24 is shown in the embodiment of FIG. 3B as comprising a linear element having a sloping angle, the opaque element 24 may comprise any suitable shape, such as a planar shape. In another embodiment, the opaque element 24 may comprise one or more apertures for controlling an amount of light passing through the opaque element 24. In addition, the opaque element 24 may comprise any suitable orientation with respect to the actuator arm 8 and light sensitive sensors 26. For example, the opaque element 24 may be curved rather than linear.

In one embodiment, the output of the light sensitive sensors 26 is used to adjust the intensity of the light emitted by the light source in an automatic gain controlled (AGC) loop.

Figures 5A, 5B:
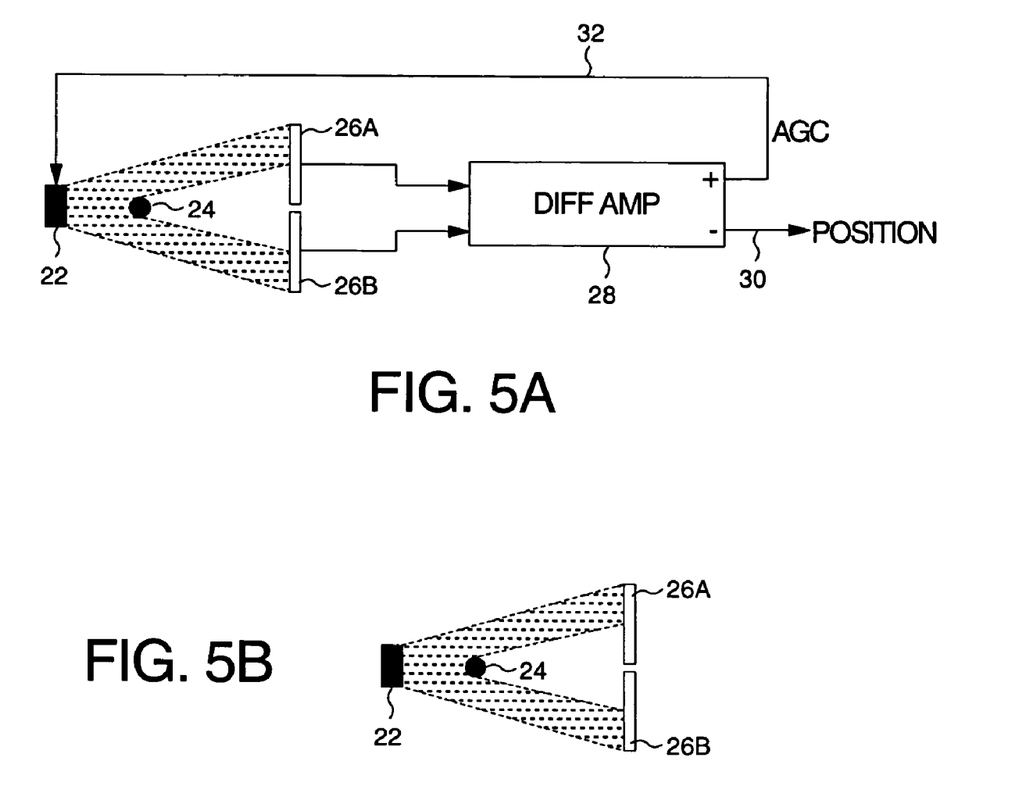
FIG. 5A shows an embodiment of the present invention wherein a differential amplifier computes a difference between the sensor outputs representing the position of the actuator arm, and the sum of the sensor outputs used to control an intensity of the light.
FIGS. 5B-5D illustrate how the amount of light each sensor detects changes relative to the position of the actuator arm according to an embodiment of the present invention.

FIG. 5A shows an embodiment of the present invention wherein a differential amplifier 28 computes a difference between a first amount of light detected by the first sensor 26A and a second amount of light detected by the second sensor 26B, wherein the difference 30 represents the position of the actuator arm 8. Also in the embodiment of FIG. 5A, the differential amplifier 28 computes a sum 32 of the first amount of light detected by the first sensor 26A and the second amount of light detected by the second sensor 26B, wherein an intensity of the light emitted by the light source is controlled in response to the sum 32 in an AGC loop.

Figure 5C:
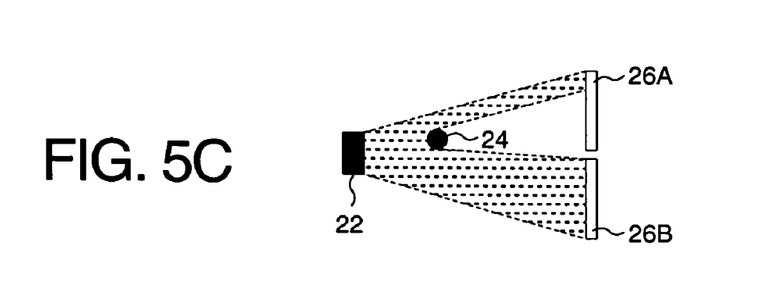
Figure 5D:
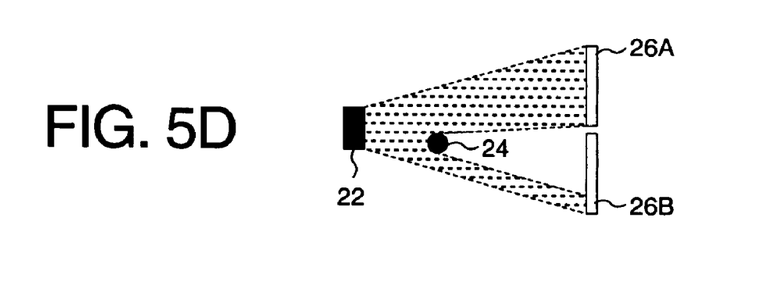

FIGS. 5B-5D correspond to FIGS. 4B-4D and illustrate how the position of the opaque element 24 changes to control the amount of light each light sensitive sensor detects relative to the position of the actuator arm 8. FIG. 5B shows that both light sensitive sensors 26A and 26B receive the same amount of light when the actuator arm 8 is near the middle of its stroke, FIG. 5C shows that bottom sensor 26B receives more light as the actuator arm 8 moves toward the OD, and FIG. 5D shows that the top sensor 26A receives more light as the actuator moves toward the ID. The difference between the amount of light each sensor detects therefore represents the position of the actuator arm 8.

Figure 6A:
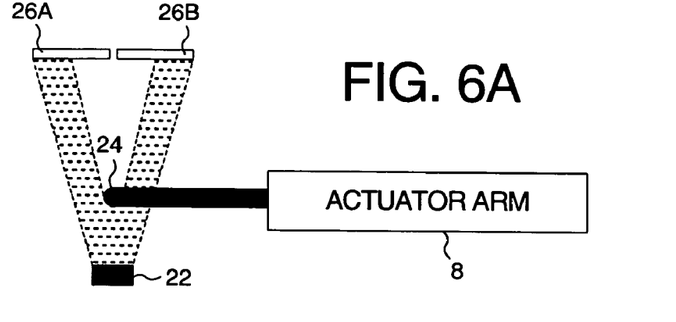
FIGS. 6A-6D illustrate an alternative embodiment of the present invention wherein the light source and light sensitive sensors are aligned vertically with respect to the surface of the disk.
Figure 6B:
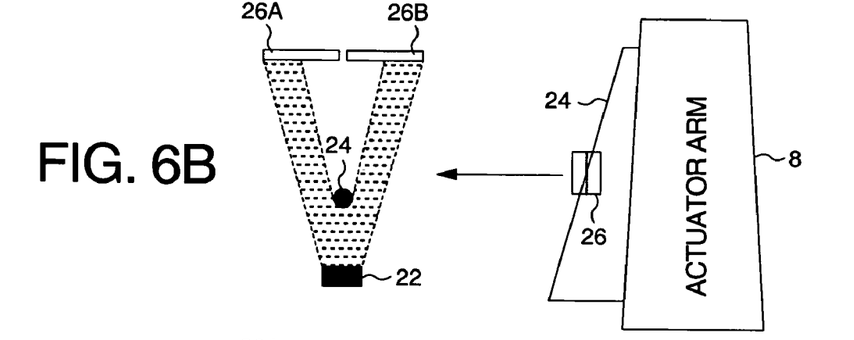
Figure 6C:
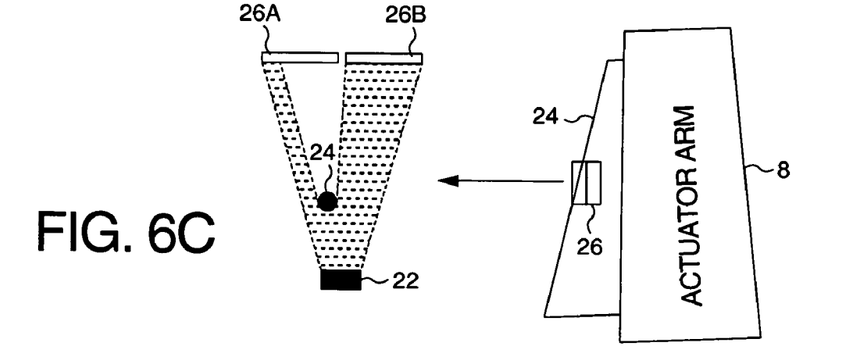
Figure 6D:
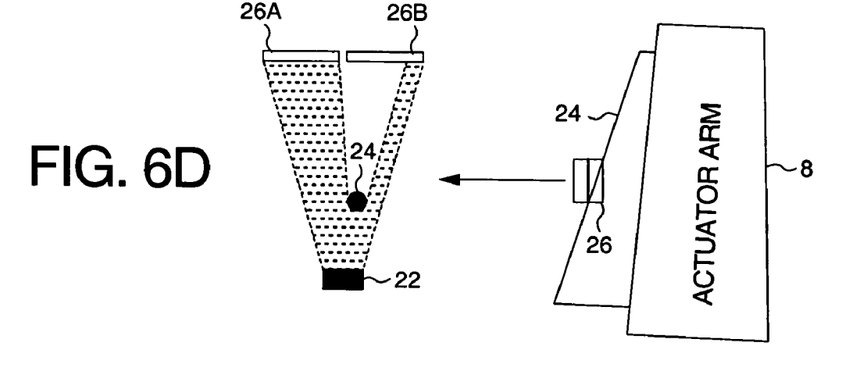

Any suitable configuration for the light source and light sensitive sensors may be employed in the embodiments of the present invention. FIG. 6A shows an alternative embodiment of the present invention wherein the light source (e.g., LED 22) and light sensitive sensors 26A and 26B are aligned substantially vertically with respect to the disk 2 (and planar surface of the actuator arm 8). FIGS. 6B-6D illustrate how the amount of light each light sensitive sensor 26A and 26B detects changes with the changing position of the actuator arm 8. FIGS. 6B-6D also illustrate an alternative shape for the opaque element 24, however, any suitable shape may be employed.

Figure 7A:
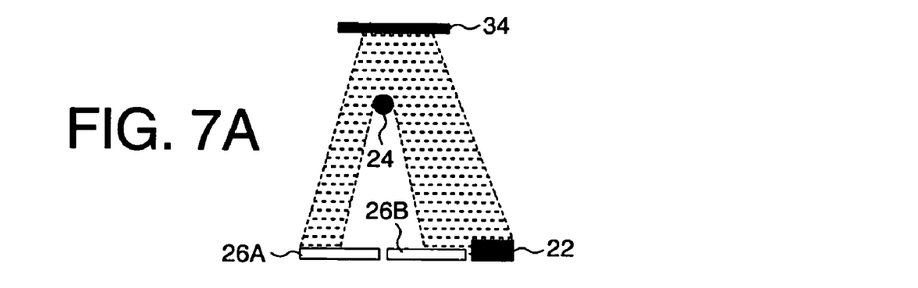
FIG. 7A illustrates an embodiment of the present invention wherein the light source comprises a light emitting device and a mirror.
Figure 7B:
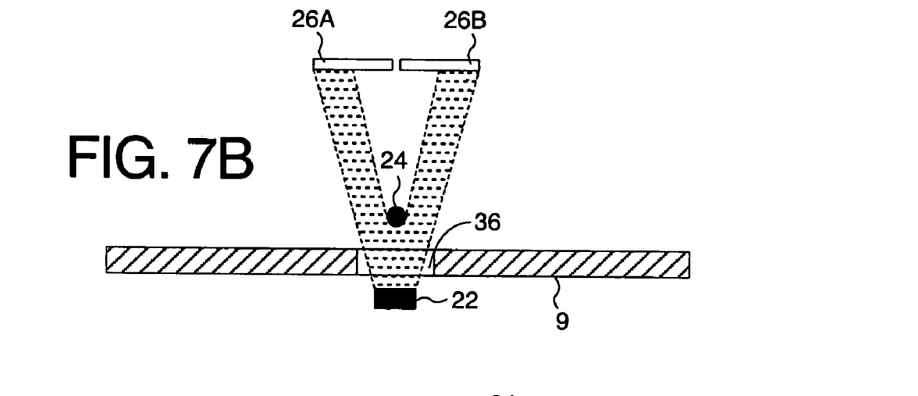
FIG. 7B shows an embodiment of the present invention wherein the HDA comprises a window, wherein the light passes through the window.
Figure 7C:
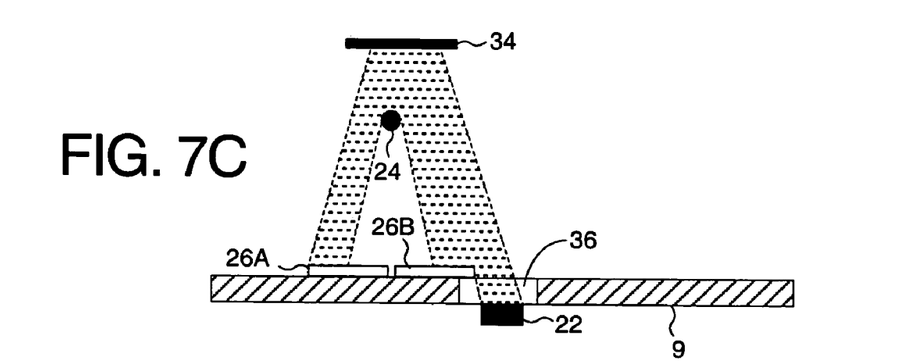
FIG. 7C shows an embodiment of the present invention wherein the light sensitive sensors are located inside the HDA.
Figure 7D:
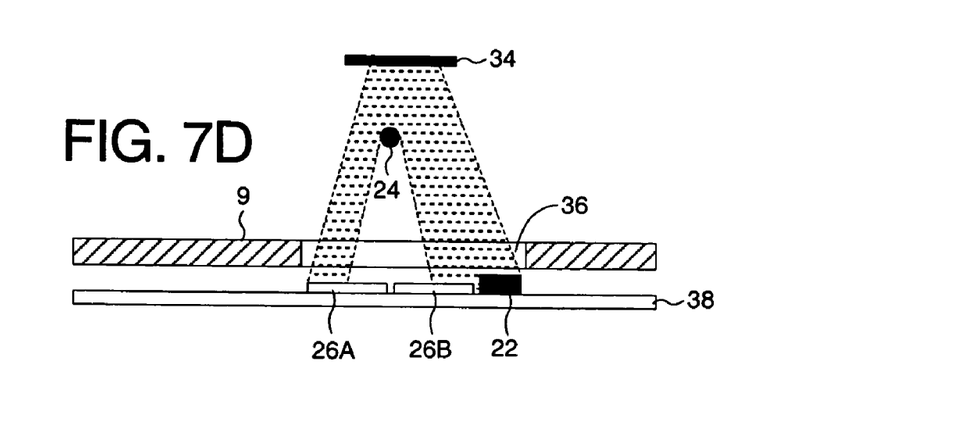
FIG. 7D shows an embodiment of the present invention wherein the light source and light sensitive sensors are mounted on a printed circuit board outside the HDA.

FIG. 7A illustrates another alternative configuration for the light source and light sensitive sensors. In this embodiment, the light source comprises a light emitting device 22 (e.g., an LED) and a mirror 34 for reflecting the light toward the light sensitive sensors 26A and 26B. FIG. 7B shows yet another configuration wherein the base 9 of the HDA comprises a window 36, and the light emitted by the light emitting device 22 passes through the window 36. This allows the light emitting device 22 to be located outside of the HDA. FIG. 7C shows an embodiment employing the mirror 34 of FIG. 7A and the window 36 of FIG. 7B, wherein the light sensitive sensors 26A and 26B are located inside the HDA. FIG. 7D shows an embodiment wherein both the light emitting device 22 and the light sensitive sensors 26A and 26B are mounted on a printed circuit board 38 located outside the HDA. In this embodiment, the light passes through the window 36, reflects off of the mirror 34, and then passes back through the window 36.

Figure 8:
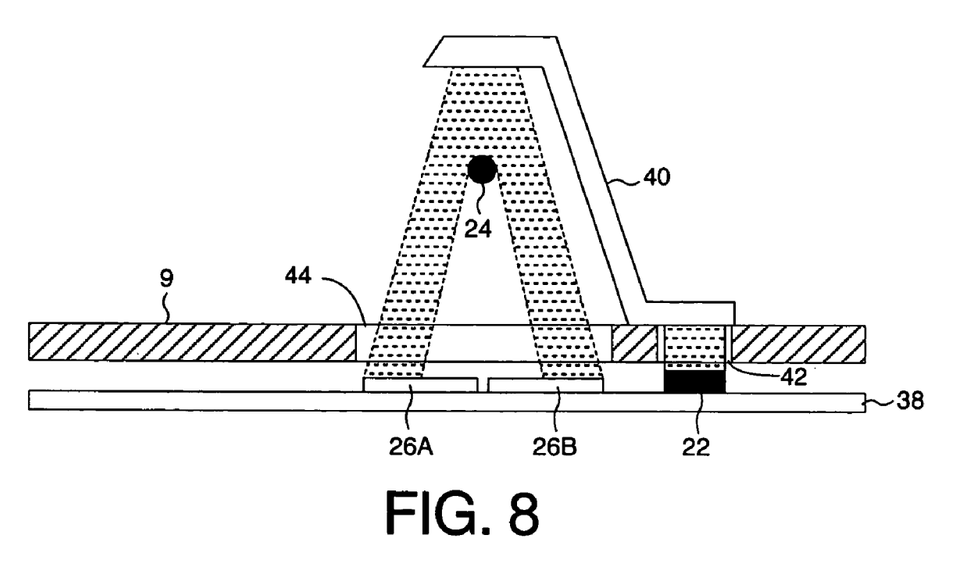
FIG. 8 shows an embodiment of the present invention wherein the light source comprises a light pipe, and the HDA comprises two windows.

FIG. 8 shows yet another embodiment of the present invention wherein the light source comprises a light emitting device 22 and a suitable light pipe 40 (e.g., a fiber optic). The light emitted by the light emitting device 22 passes through a first window 42 in the base 9 of the HDA, and is directed from one end of the light pipe 40 to the other end. The light then shines toward the light sensitive sensors 26A and 26B with appropriate shading by the opaque element 24. In this embodiment, the light passes through a second window 44 in the HDA before reaching the light sensitive sensors 26A and 26B located outside of the HDA.

Figure 9A:
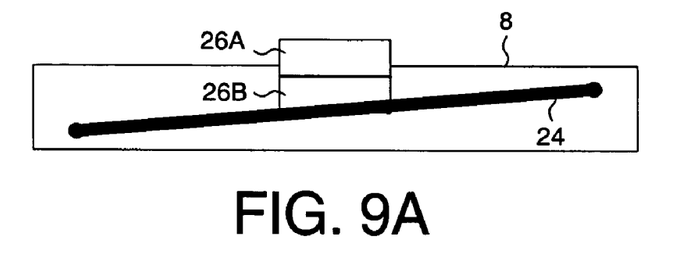
FIGS. 9A-9C illustrate an alternative embodiment of the present invention wherein the opaque element controls an amount of light one of the light sensitive sensors detects.
Figure 9B:
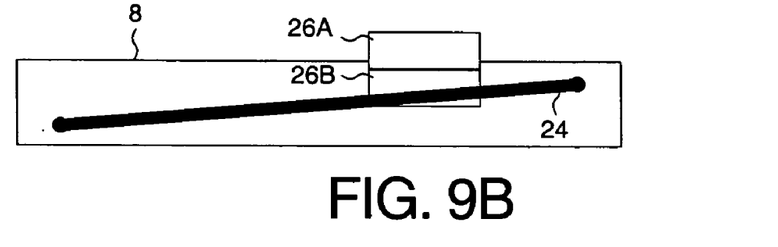
Figure 9C:
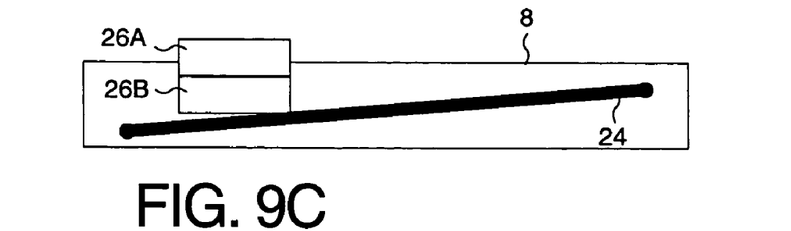

FIGS. 9A-9C illustrate another embodiment of the present invention wherein the opaque element 24 is configured to control the amount of light received only by the bottom sensor 26B. When the actuator arm 8 is near the middle of its stroke, as shown in FIG. 9A, the opaque element covers a predetermined area of the bottom sensor 26B. As the actuator arm 8 rotates toward the OD as shown in FIG. 9B, more of the opaque element 24 covers the bottom sensor 26B, and as the actuator arm 8 rotates toward the ID as shown in FIG. 9C, less of the opaque element 24 covers the bottom sensor 26B. In this embodiment, the output from both light sensitive sensors 26A and 26B may be used to control the intensity of the light in an AGC loop, for example, using the differential amplifier 28 shown in FIG. 5A.

In one embodiment, the optical sensor 20 for detecting the position of the actuator arm 8 is calibrated for each disk drive to compensate for manufacturing tolerances. Any suitable technique may be employed to calibrate the optical sensor 20, such as positioning the actuator arm 8 to a known position and measuring the output of the light sensitive sensors 26. In one embodiment, the actuator arm 8 is pressed against a crash stop (e.g., at the OD or ID of its stroke) in order to calibrate the optical sensor 20. In another embodiment, embedded servo sectors are recorded on the surface of the disk 2 to define a number of radially spaced, concentric servo tracks, and the position of the actuator arm 8 is detected relative to the location of the head 6 with respect to the servo tracks. For example, the actuator arm 8 may be rotated by the VCM until the head 6 detects the middle servo track on the surface of the disk 2. The difference between the sensor outputs represents a DC offset that is then subtracted from the detected position of the actuator arm 8.

Figure 10A:
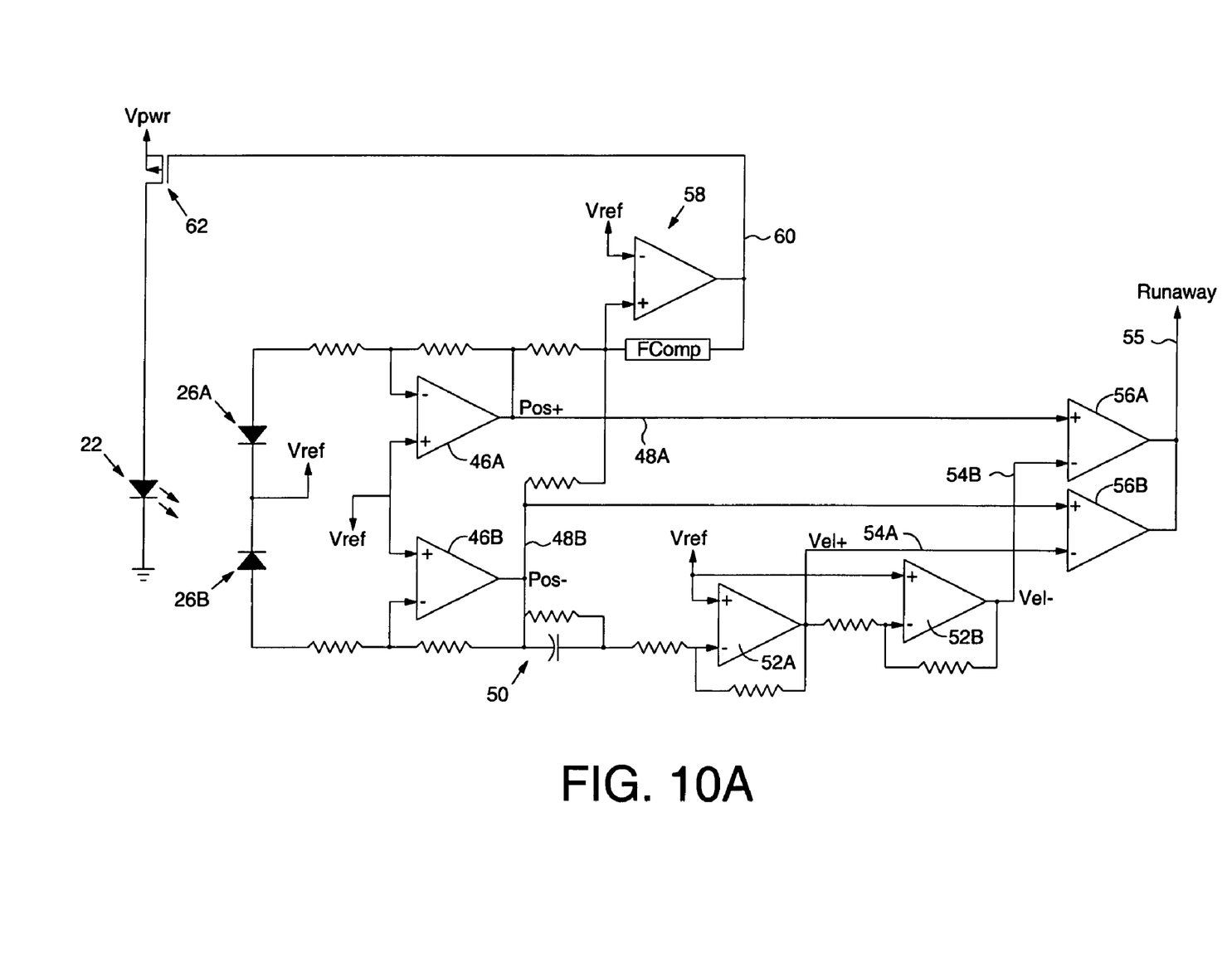
FIG. 10A illustrates control circuitry according to an embodiment of the present invention for detecting the estimated position and estimated velocity of the actuator arm, as well as the runaway condition in continuous time using analog circuitry.

FIG. 10A illustrates control circuitry according to an embodiment of the present invention for detecting the estimated position and estimated velocity of the actuator arm 8, as well as the runaway condition in continuous time using analog circuitry coupled to the optical sensor 20 discussed above. The output of the light sensitive sensors 26A and 26B are compared to a reference voltage by analog amplifiers 46A and 46B to generate a first position signal Pos+ 48A and a second position signal Pos− 48B representing the position of the actuator arm 8 with respect to the outer and inner diameter of the disk 2, respectively. A resistor and capacitor network 50 form an analog differentiator for computing a derivative of the estimated position Pos− 48B in continuous time. A first inverting amplifier 52A generates a first estimated velocity Vel+ 54A representing a velocity of the actuator arm 8 toward the outer diameter of the disk 2, and a second inverting amplifier 52B generates a second estimated velocity Vel− 54B representing a velocity of the actuator arm 8 toward the inner diameter of the disk 2. A runaway condition 55 is detected if a first analog comparator 56A detects that the first position signal Pos+ 48A exceeds the second estimated velocity Vel− 54B, or if the second position signal Pos− 48B exceeds the first estimated velocity Vel+ 54A. This embodiment detects the runaway condition 55 under essentially all circumstances since it operates in continuous time independent of other control circuitry, such as a microprocessor. If a microprocessor running a servo control program malfunctions due to a programming error, the circuitry in FIG. 10A will detect the runaway condition and adjust the control signal applied to the VCM 35 accordingly.

The control circuitry of FIG. 10A further comprises an amplifier 58 for amplifying the sum of the position signals Pos+ 48A and Pos− 48B to generate an AGC control signal 60. The AGC control signal 60 drives a transistor 62 to control the amount of light emitted by the light source 22.

Figure 10B:
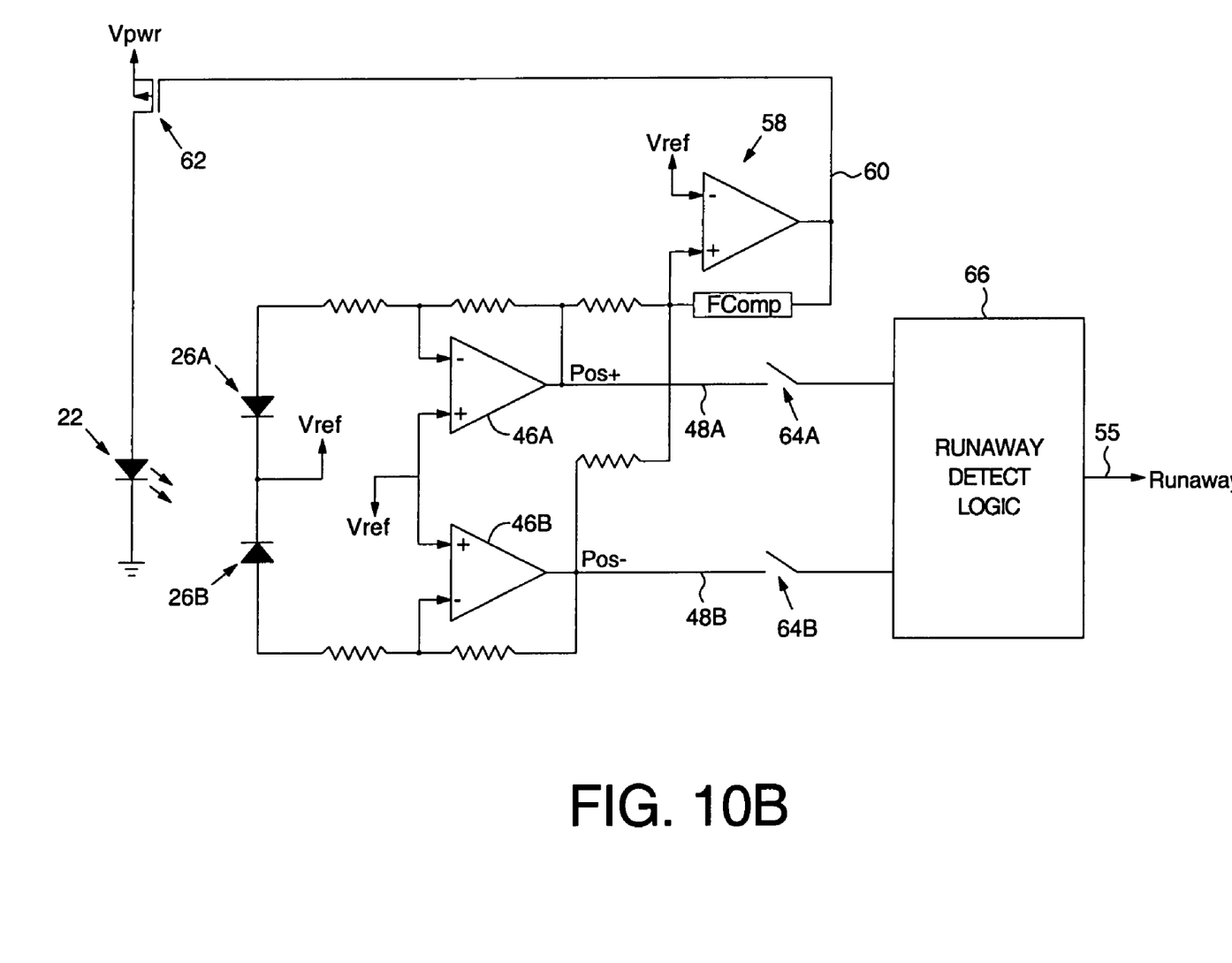
FIG. 10B illustrates control circuitry according to an embodiment of the present invention for detecting the estimated velocity of the actuator arm and the runaway condition in discrete time using digital circuitry.

FIG. 10B shows an alternative embodiment of the present invention wherein the control circuitry comprises a first sampling device 64A for sampling the first position signal 48A and a second sampling device 64B for sampling the second position signal 48B. Runaway detect logic 66 processes the sampled position signals in order to estimate the velocity of the actuator arm 8 and detect the runaway condition 55 in discrete time using discrete-time or digital circuitry (e.g., a microprocessor running a servo control program). This embodiment may help prevent a runaway condition in the event synchronization to the servo sectors $21_0$-$21_N$ is lost due, for example, to a defect on the disk 2.

Figure 11A:
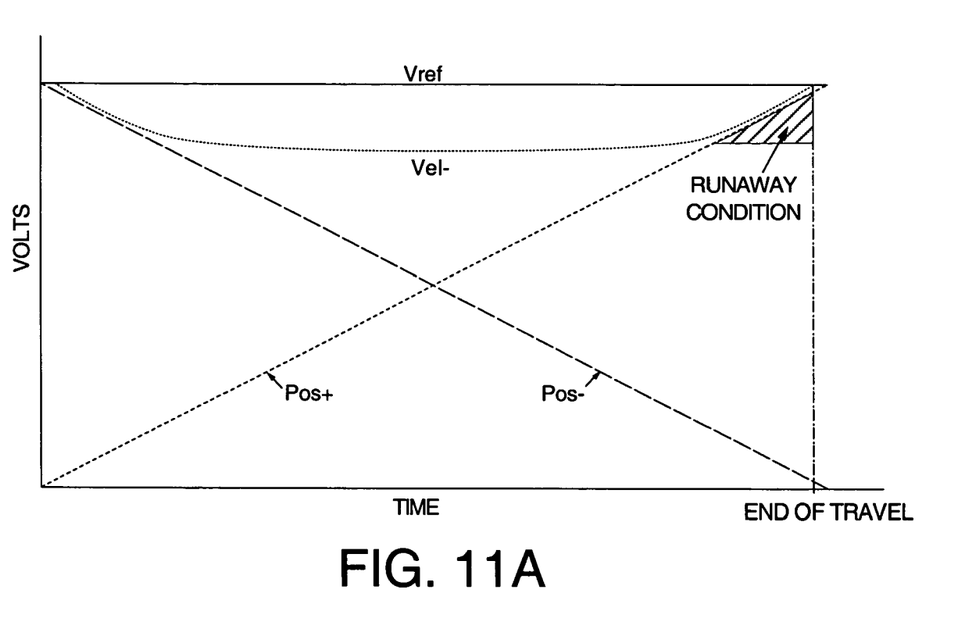
FIGS. 11A-11B illustrate how the runaway condition is detected if the estimated velocity of the actuator arm exceeds a threshold when the estimated position of the actuator arm approaches the inner or outer diameter of the disk.
Figure 11B:
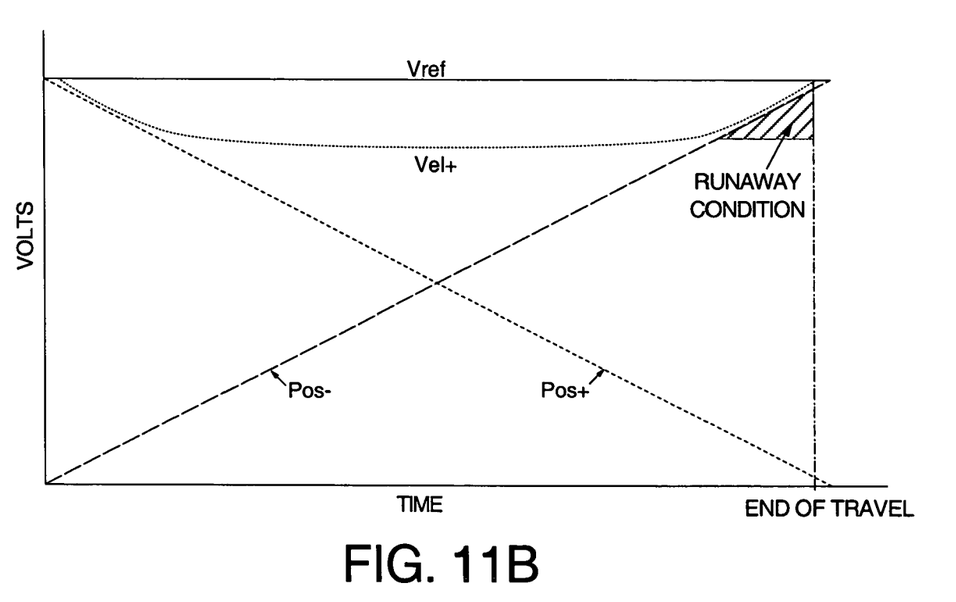

FIGS. 11A and 11B illustrate exemplary operation of the control circuitry for detecting the runaway condition if the estimated velocity of the actuator arm 8 exceeds a threshold when the estimated position of the actuator arm 8 approaches the inner or outer diameter of the disk 2. FIG. 11A illustrates how the runaway condition is detected while the actuator arm 8 is moving toward the inner diameter of the disk 2 such that the voltage representing the estimated velocity Vel− is non-zero (relative to a reference voltage). As the actuator arm 8 moves toward the inner diameter of the disk 2, the position signal Pos+ increases. The runaway condition is detected if the position signal Pos+ exceeds the estimated velocity Vel− as illustrated by the shaded area of FIG. 11A. FIG. 11B illustrates how the runaway condition is detected while the actuator arm 8 is moving toward the outer diameter of the disk 2 such that the voltage representing the estimated velocity Vel+ is non-zero (relative to a reference voltage). As the actuator arm 8 moves toward the outer diameter of the disk 2, the position signal Pos− increases. The runaway condition is detected if the position signal Pos− exceeds the estimated velocity Vel+ as illustrated by the shaded area of FIG. 11B.

Of course, other means for comparing the position and velocity of the actuator arm to allowed values (i.e., values that would not represent a runaway condition) may also be used. For example, in one embodiment, a lookup table may be used representing a continuum of allowed or runaway values.

If the runaway condition is detected, the control signal applied to the VCM 35 may be adjusted in any suitable manner. In one embodiment, the runaway detect signal 55 modifies operation of the servo control circuitry, for example, by modifying the target position for the head 6 toward the middle of the disk. In another embodiment, the runaway detect signal 55 may activate a park circuit so that the VCM 35 parks the head 6 independent of other control circuitry, similar to parking the head 6 during a power failure event. In an alternative embodiment, the runaway detect signal 55 generates an interrupt to a microprocessor which performs an intelligent parking operation in order to park the head 6. In yet another embodiment, the runaway detect signal 55 directly modifies the current applied to the VCM 35, for example, disabling the current or reversing the direction of the current in order to brake the VCM 35. In still another embodiment, the runaway detect signal 55 resets the disk drive (e.g., resets a microprocessor) similar to a watchdog timer wherein the control circuitry will then park the head 6 by executing an intelligent parking operation.

We claim:
1. A disk drive comprising:
   (a) a disk comprising a plurality of servo sectors that define a plurality of servo tracks;
   (b) an actuator arm;
   (c) a head attached to a distal end of the actuator arm;
   (d) a mechanical position sensor operable to detect a position of the actuator arm;
   (e) a voice coil motor operable to rotate the actuator arm about a pivot; and
   (f) control circuitry operable to:
       process the servo sectors to generate a control signal applied to the voice coil motor;
       detect a velocity of the actuator arm;
       detect a runaway condition by comparing the position of the actuator arm to the velocity of the actuator arm; and
       adjust the control signal applied to the voice coil motor if the runaway condition is detected.

2. The disk drive as recited in claim 1, wherein the mechanical position sensor comprises an optical sensor.

3. The disk drive as recited in claim 1, wherein the control circuitry is further operable to detect the velocity of the actuator arm by computing a derivative of the position detected by the mechanical position sensor.

4. The disk drive as recited in claim 1, wherein the control circuitry comprises analog circuitry operable to detect the velocity of the actuator arm in continuous time.

5. The disk drive as recited in claim 4, wherein the control circuitry comprises an analog differentiator circuit operable to detect the velocity of the actuator arm in continuous time.

6. The disk drive as recited in claim 4, wherein the control circuitry comprises analog circuitry operable to detect the runaway condition by processing the position and velocity in continuous time.

7. The disk drive as recited in claim 1, wherein the control circuitry comprises an analog comparator operable to compare the position to the velocity in continuous time.

8. The disk drive as recited in claim 1, wherein the control circuitry comprises discrete time circuitry operable to detect the runaway condition by processing the position and velocity in discrete time.

9. A method of operating a disk drive, the disk drive comprising a disk having a plurality of servo sectors that define a plurality of servo tracks, an actuator arm, a head attached to a distal end of the actuator arm, a mechanical position sensor operable to detect a position of the actuator arm, and a voice coil motor for rotating the actuator arm about a pivot, the method comprising the steps of:
- processing the servo sectors to generate a control signal applied to the voice coil motor;
- detecting a velocity of the actuator arm;
- detecting a runaway condition by comparing the position of the actuator arm to the velocity of the actuator arm; and
- adjusting the control signal applied to the voice coil motor if the runaway condition is detected.

10. The method as recited in claim 9, wherein the mechanical position sensor comprises an optical sensor.

11. The method as recited in claim 9, wherein the step of detecting the velocity of the actuator arm comprises the step of computing a derivative of the position detected by the mechanical position sensor.

12. The method as recited in claim 9, wherein the velocity of the actuator arm is detected in continuous time.

13. The method as recited in claim 9, wherein the position is compared to the velocity in continuous time.

14. The method as recited in claim 9, wherein the position is compared to the velocity in discrete time.

* * * * *